(12) United States Patent
Shih et al.

(10) Patent No.: US 7,701,539 B2
(45) Date of Patent: Apr. 20, 2010

(54) LIQUID CRYSTAL PANEL AND DRIVER DEVICE THEREOF

(75) Inventors: Po-Sheng Shih, Taoyuan County (TW); Hsuan-Lin Pan, Taoyuan County (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 418 days.

(21) Appl. No.: 11/695,109

(22) Filed: Apr. 2, 2007

(65) Prior Publication Data

US 2008/0129912 A1    Jun. 5, 2008

(30) Foreign Application Priority Data

Dec. 5, 2006    (TW)    ............................... 95145375 A

(51) Int. Cl.
*G02F 1/1343*    (2006.01)
*G09G 3/36*    (2006.01)

(52) U.S. Cl. ............................. 349/139; 345/87; 345/92

(58) Field of Classification Search ....................... None
See application file for complete search history.

(56) References Cited

U.S. PATENT DOCUMENTS

2003/0156087 A1*    8/2003    Boer et al.    .................... 345/92

2003/0179323 A1*    9/2003    Abileah et al.    ................ 349/24
2006/0097976 A1*    5/2006    Lee et al.    ....................... 345/98
2007/0040814 A1*    2/2007    Lee et al.    ..................... 345/173

* cited by examiner

*Primary Examiner*—Uyen-Chau N Le
*Assistant Examiner*—Chris H Chu
(74) *Attorney, Agent, or Firm*—Thomas, Kayden, Horstemeyer & Risley

(57) ABSTRACT

The invention provides a liquid crystal display panel, comprising a plurality of scan lines fabricated along a first axis, a plurality of data lines fabricated along a second axis, a first pixel and a second pixel. Each of the first and second pixels is surrounded by two adjacent scan lines and two adjacent data lines. The first pixel comprises a first thin film transistor (TFT). The second pixel comprises a second and a third TFT. The gates of the second and third TFT are electrically connected to the two adjacent scan lines surrounding the second pixel, respectively. The third TFT further comprises a source electrically connected to a photo-sensor, and a drain electrically connected to an access line fabricated along the second axis. One end of the access line is electrically connected to a signal processor via a switch.

20 Claims, 7 Drawing Sheets

LIQUID CRYSTAL PANEL AND DRIVER DEVICE THEREOF

BACKGROUND OF THE INVENTION

1. Field of the Invention

The invention relates to liquid crystal panels, and particularly relates to the driver devices thereof.

2. Description of the Related Art

There are three types of touch panel: resistive, surface wave, and capacitive. Resistive touch panels are usually limited to small size. Surface wave touch panels register contact by electromagnetic response or by electromagnetic transmission. Capacitive touch panels register contact by capacitive response, with coordinates of the contact point evaluated according to variations in capacitance generated.

Conventionally, touch panels and liquid crystal display panels are manufactured separately and combined into a finished product. The separately manufactured liquid crystal display panel and touch panel result in a heavy and expensive finished product with low transparency. To deal with the above drawbacks, a liquid crystal touch panel, which integrally fabricates the touch panel and the liquid crystal display panel in the same panel, is in development.

FIG. 1 illustrates a conventional liquid crystal touch panel. As shown in FIG. 1, the liquid crystal display panel 10 comprises a plurality of scan lines 12 fabricated along a first axis, a plurality of data lines 14 fabricated along a second axis, a plurality of first pixels 16, and a plurality of second pixels 18. As shown in FIG. 1, each of the first and second pixels (16 and 18) is surrounded by two adjacent scan lines 12 and two adjacent data lines 14. The first pixel 16 comprises a first thin film transistor 20. The first thin film transistor 20 has a gate electrically connected to one of the two adjacent scan lines surrounding the first pixel, a source electrically connected to one of the two adjacent data lines surrounding the first pixel, and a drain electrically connected to a pixel electrode (not shown in FIG. 1). The second pixel 18 comprises a second thin film transistor 22 and a third thin film transistor 24. The gates of the second and third thin film transistors 22 and 24 are electrically connected to the two adjacent scan lines surrounding the second pixel, respectively. The second pixel 22 further comprises a source electrically connected to one of the two adjacent data lines surrounding the second pixel, and a drain electrically connected to a pixel electrode (not shown in FIG. 1). The third thin film transistor 24 further comprises a source electrically connected to a photo-sensor, and a drain electrically connected to an access line 28. The photo-sensor may be implemented by a fourth thin film transistor 26, as the FIG. 1 shows. The fourth thin film transistor 26 has a gate and a source both electrically connected to a bias voltage line 30, and a drain electrically connected to the drain of the third thin film transistor 24. In response to external light, the fourth thin film transistor 26 generates a current as a photo-sensed signal. The photo-sensed signal is passed to the access line 28 via the third thin film transistor 24 and then transmitted to a signal processor (shown in FIG. 2). After the signal processing, contact is available.

FIG. 2 illustrates the peripheral circuit of the liquid crystal display panel 10. As shown in FIG. 2, between an access line 28 and the signal processor 32, a fan-out line 34 couples the access line 28 to a connection pad 36 of the liquid crystal display panel 10. The length of fan-out line 34 is dependent on the access line 28 coupling to the fan-out line 34. The resistance of fan-out line 34 is dependent on the length of the fan-out line 34. The transmission of the photo-sensed signal is affected by the different resistance of fan-out lines 34. Therefore, the signal processor 32 cannot deal correctly with the received photo-sensed signal.

FIG. 4 shows a simulated result of the liquid crystal display panel 10. As shown in the lower waveform of FIG. 4, in the gate-in terminal of an access line 28, the photo-sensed signal measures 9.8827 µA. As shown in the top waveform of FIG. 4, in the gate-end terminal of the connection pad 36, the photo-sensed signal measures 6.423 µA. There is an error between the measurements. Therefore, a solution for the asynchronous gate-in/gate-end signals is called for.

BRIEF SUMMARY OF THE INVENTION

The invention provides liquid crystal touch panels. The invention comprises a switch fabricated between a fan-out line of an access line of the invention and a signal processor. The switch allows a photo-sensed signal to be transmitted from the access line to the signal processor via a fan-out line. The switch provides a solution for the asynchronous gate-in and gate-end terminals.

In an embodiment of the invention, a liquid crystal touch panel comprises a plurality of scan lines fabricated along a first axis, a plurality of data lines fabricated along a second axis, a first pixel, and a second pixel. Each of the first and second pixels is surrounded by two adjacent scan lines and two adjacent data lines. The first pixel comprises a first thin film transistor. The second pixel comprises a second thin film transistor and a third thin film transistor. The gates of the second and third pixels are electrically connected to the two adjacent scan lines surrounding the second pixel, respectively. The source of the third thin film transistor is electrically connected to a photo-sensor. The drain of the third thin film transistor is electrically connected to an access line. The access line is fabricated along the second axis. One terminal of the access line is electrically connected to a signal processor via a switch.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
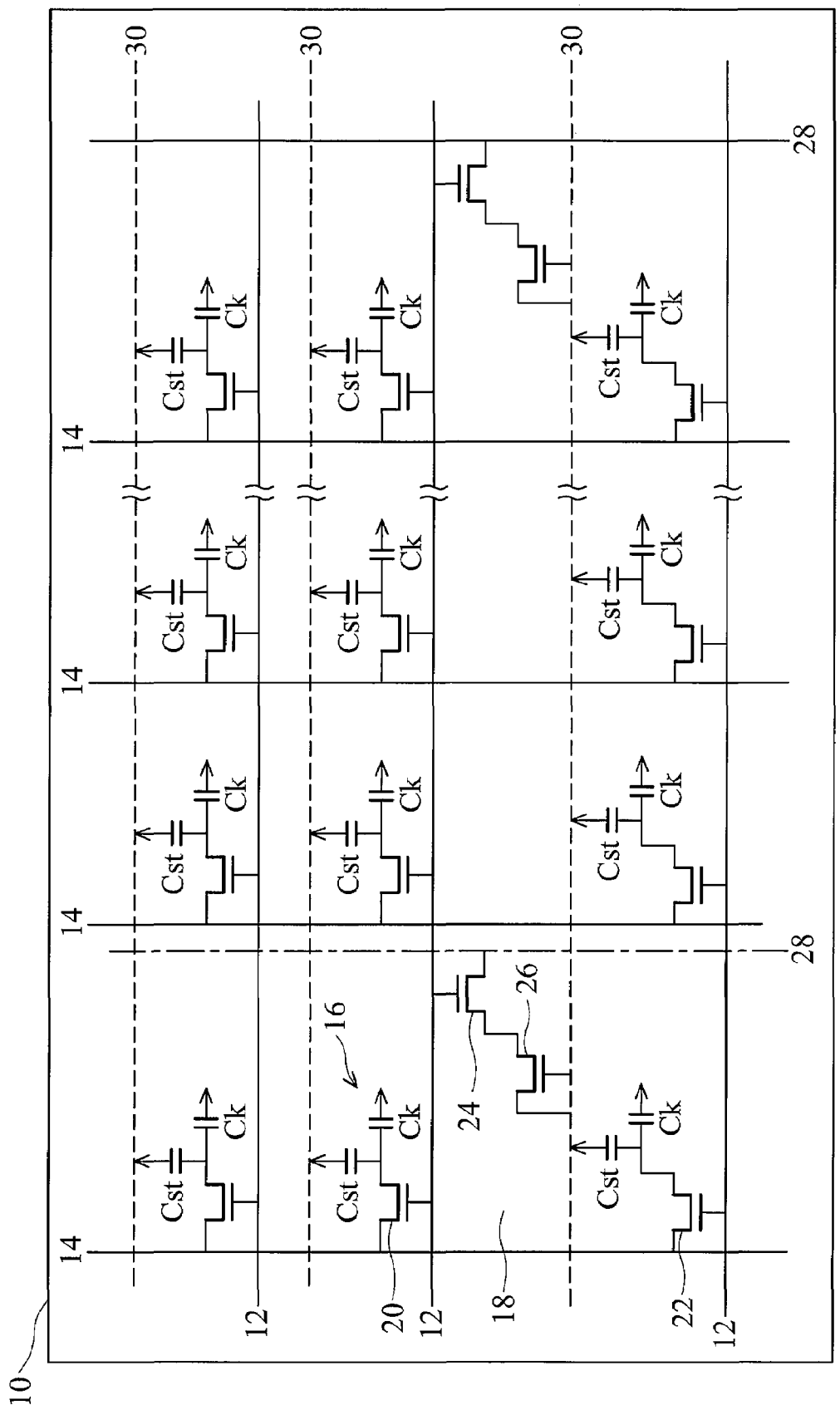
FIG. 1 illustrates a portion of a conventional liquid crystal touch panel.
Figure 2:
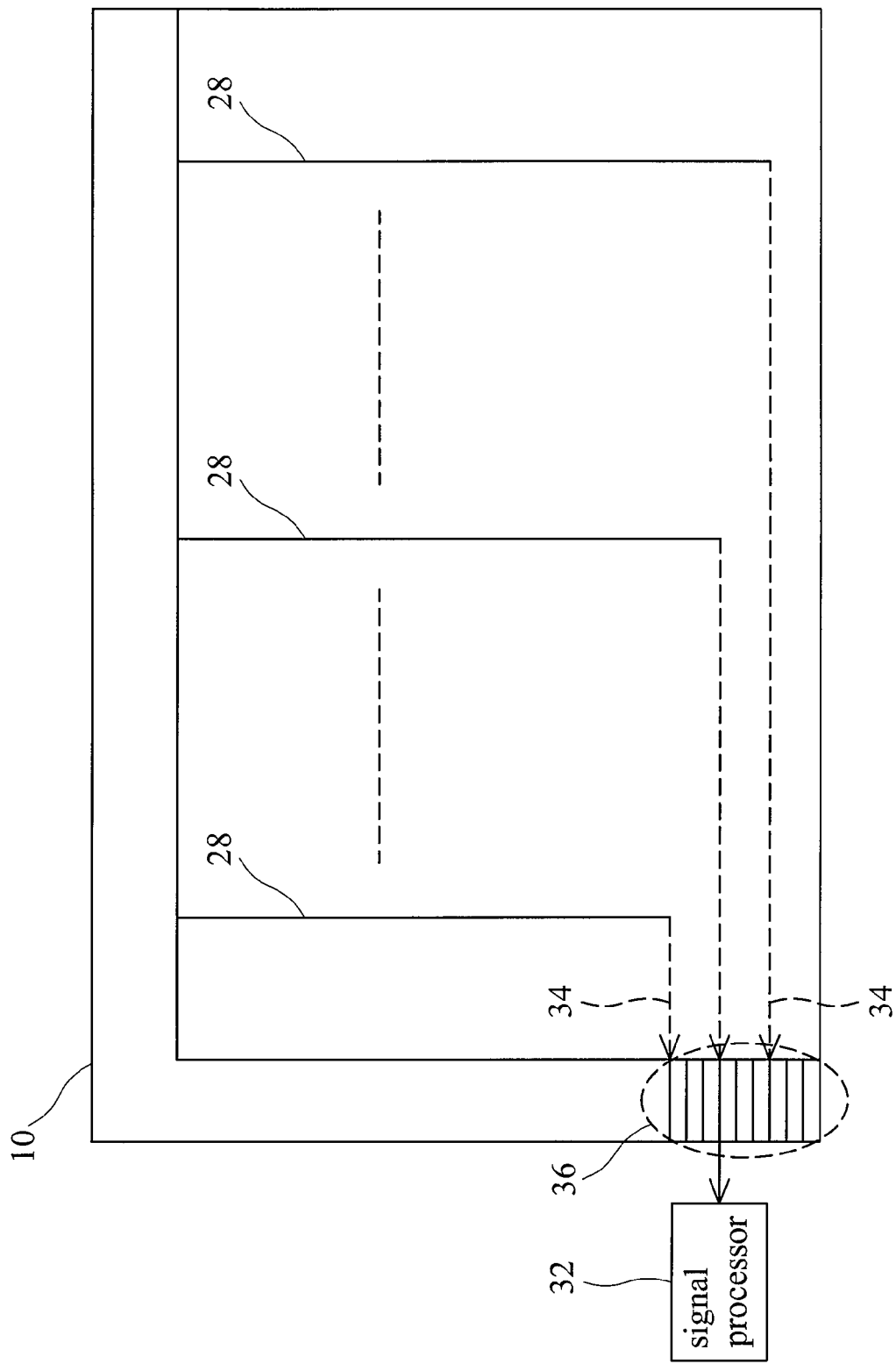
FIG. 2 illustrates another portion of the conventional liquid crystal touch panel.
Figure 3:
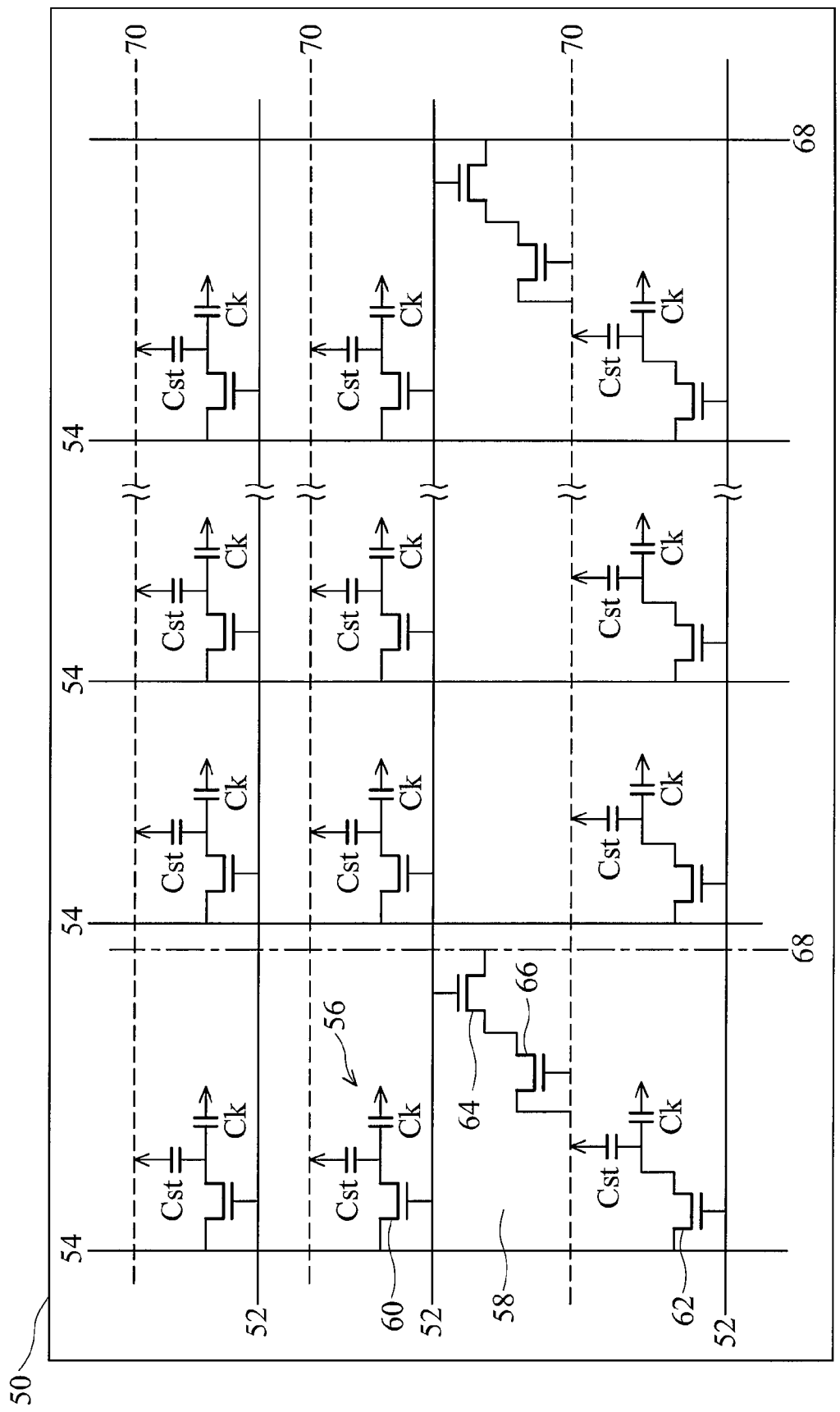
FIG. 3 illustrates a portion of a liquid crystal touch panel of the invention.

FIG. 3 illustrates an exemplary embodiment of the invention, a liquid crystal touch panel. As shown, a liquid crystal display panel comprises a plurality of scan lines 52 fabricated along a first axis, a plurality of data lines 54 fabricated along a second axis, a plurality of first pixels 56, and a plurality of second pixels 58. As shown in FIG. 3, each of the first pixels 56 is surrounded by two adjacent scan lines 52 and two adjacent data lines 54. The first pixel 56 comprises a first thin film transistor 60 having a gate electrically connected to one of the two adjacent scan lines, a source electrically connected to one of the data lines, and a drain electrically connected to a pixel electrode (not shown). When the first thin film transistor 60 is turned on, data transmitted in the data line 54 is passed to the pixel electrode to display images. As shown in FIG. 3, each of the second pixels 58 is surrounded by two adjacent scan lines 52 and two adjacent data lines 54. The second pixel 58 comprises a second thin film transistor 62 and a third thin film transistor 64. The gates of the second and third thin film transistors 62 and 64 are electrically connected to the two adjacent scan lines surrounding the second pixel 58, respectively. The second thin film transistor 62 comprises a source electrically connected to one of the two adjacent data lines, and a drain electrically connected to a pixel electrode (not shown). Operation of the second thin film transistor 62 is similar to the first thin film transistor 60. When the second thin film transistor 62 is turned on, the data transmitted by the data line 54 is passed to the pixel to display images. The third thin film transistor 64 comprises a source electrically connected to a photo-sensor, and a drain electrically connected to an access line 68 fabricated along the second axis. The photo-sensor is generally implemented by a thin film transistor named as fourth thin film transistor 66, as shown in FIG. 3. But it should be known that the photo-sensor in the exemplary embodiment can also be implemented by a photo-sensitive diode, a photo-sensitive resistor, and so on. The fourth thin film transistor 66 comprises a gate and a source both electrically connected to a bias voltage line 70 at a constant voltage level, and a drain electrically connected to the source of the third thin film transistor 64. When the fourth thin film transistor 66 is triggered by external light, a photo-current is generated by the fourth thin film transistor 66 as a photo-sensed signal, and passed to the access line 68 via the third thin film transistor 64. The access line 68 transmits the photo-sensed signal to a signal processor 72 (shown in FIG. 5). After processing by the signal processor 72, the coordinates of contact on the panel 50 are available.

Figure 5:
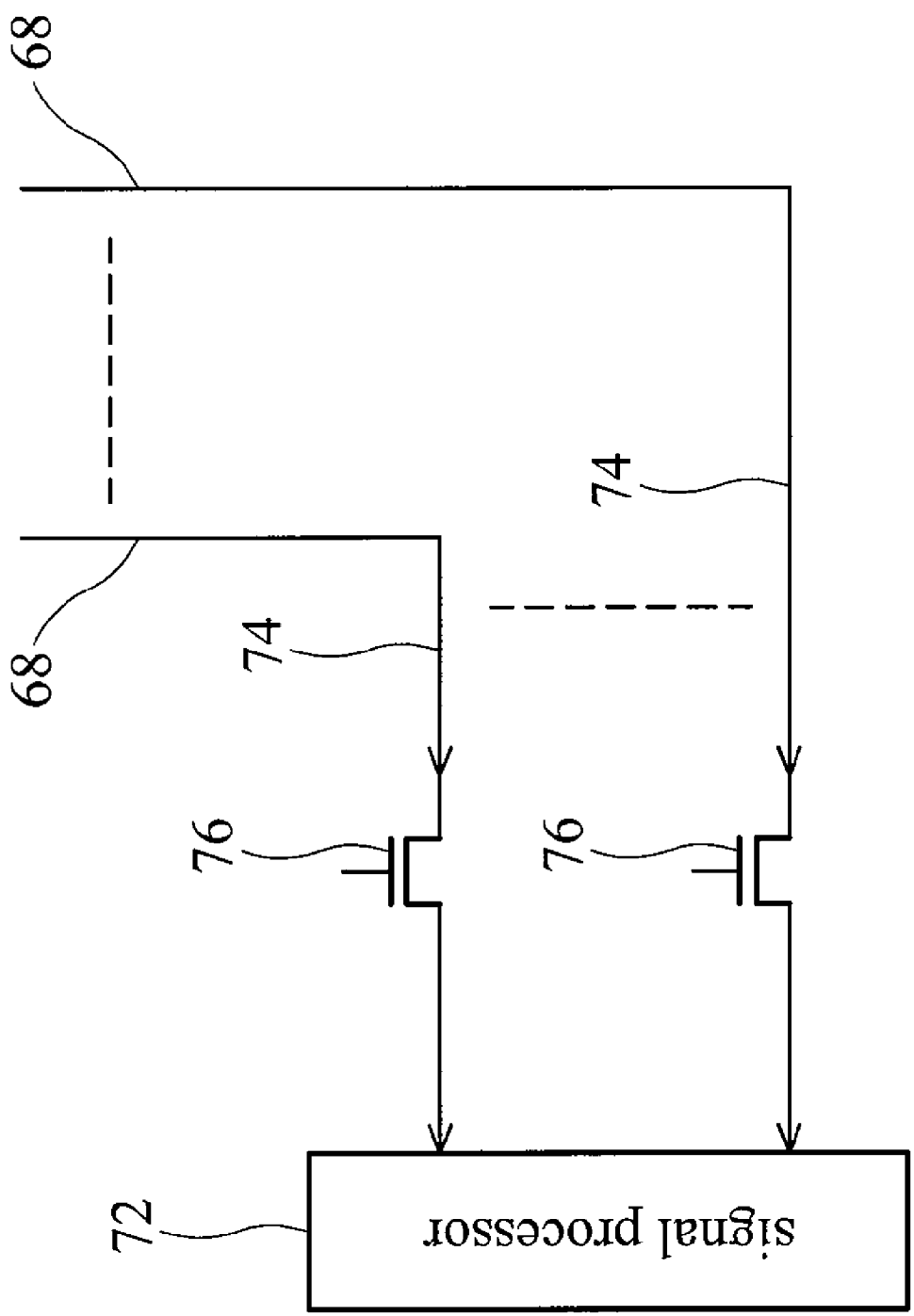
FIG. 5 illustrates another portion of the liquid crystal touch panel of the invention.

FIG. 5 illustrates the difference between the invention and conventional technique. As shown, each access line 68 is electrically connected to a signal processor 72 via an access line 68, a fan-out line 74 and a switch 76. The switch 76 may be implemented as a component of metal oxide semiconductor or any like elements, utilized to control conduction between the fan-out line 74 and the signal processor 72 to transmit the photo-sensed signal from the access line 68 to the signal processor 72. The switch 76 is controlled by a control signal dependent on the status of the third thin film transistor 64. When a pulse signal is applied to the gate of the third thin film transistor 64 to turn on the third thin film transistor 64, the switch 76 is turned on by the control signal simultaneously. Consequently, when the third thin film transistor 64 is turned on to transmit the photo-sensed signal generated by the fourth thin film transistor 66 to the access line 68, the switch 76 is turned on to allow the transmission from the access line 68 to the signal processor 72 via the fan-out line 74. When no pulse signal is applied to the third thin film transistor 64, the third thin film transistor 64 and the switch 76 remain off, and access line 68 floats. The switches 76 further prevent leakage current generated by unused photo-sensors 66.

In some embodiments, to overcome resistance mismatch of the conductive lines (each comprising an access line 68 and a fan-out line 74), the switches 76 are designed to have on-resistance much larger than the resistance of the corresponding conductive lines. Because the resistance of the transmission paths (each comprising an access line 68, a fan-out line 74, and a switch 76) are similar to each other, data can synchronously transmit on the transmission paths.

Figure 6:
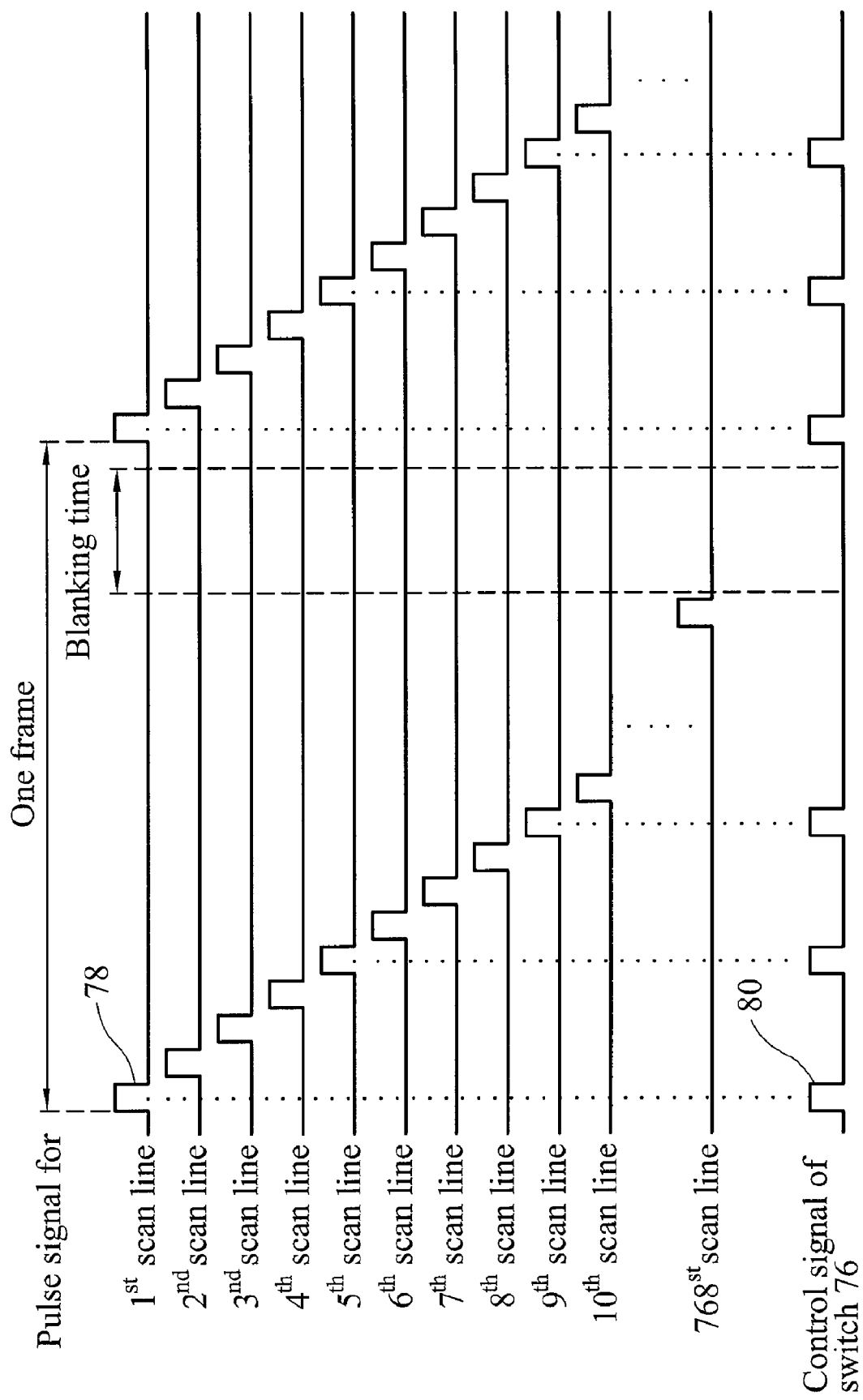
FIG. 6 shows pulse signals driving the scan lines and a control signal of the switch of the invention.

Compared with the first pixel 56, the second pixel 58 further comprises third thin film transistor 64 and the fourth thin film transistor 66 which affect image quality. For this reason, in an embodiment of the invention, the second pixels 58 of a panel are sparsely distributed in the liquid crystal display panel 50 and spaced by the first pixels 56 to ensure image quality. In an embodiment, the second pixel 58 is implemented to display blue, blue not being sensitive to the naked eye. In an embodiment of the invention, the second pixels 58 are spaced every four scan lines 52, that is to say, only the $1^{st}$, $5^{th}$, $9^{th}$ . . . scan lines (52) are electrically connected to the third thin film transistors 64. FIG. 6 shows the pulse signals (marked as 78) for scan lines 52, and the control signal (marked as 80) of switch 76. To display one image frame, a gate driver (not shown in FIG. 6) generates pulse signals 78 to sequentially drive the scan lines (from the $1^{st}$ scan line to the $768^{th}$ scan line). As shown in the lowest waveform of FIG. 6, the control signal is in a high state to turn on the switch 76 when any of the $1^{st}$, $5^{th}$, $9^{th}$ . . . scan lines is activated to turn on the third thin film transistor 64 thereof. Therefore, the photo-sensed signal transmitted to the access line 68 can be transmitted to the signal processor 72 by way of the corresponding fan-out line 74. When any of the $2^{nd}$-$4^{th}$, $6^{th}$-$8^{th}$, $10^{th}$-$12^{th}$ . . . scan lines are activated, the control signal is in a low state to turn off the switch 76. At this time, all of the third film transistors 64 of the panel and the corresponding switches 76 are turned off, and the access lines 68 float. As shown in the lowest waveform of FIG. 6, the control signal is in the low state during a blanking time.

The liquid crystal touch panel comprises a switch 76, fabricated between the corresponding fan-out line 74 and the signal processor 72, allowing the photo-sensed signal to be transmitted from the access line 68 to the signal processor 72 by the way of the fan-out line 74. When the switch 76 is turned off, the access line 68 floats to avoid transmission of leakage current from the access line 68 to the signal processor 72. The switch 76 further provides a solution for erroneous judgment caused by different impedance of the fan-out lines 74.

Figure 4:
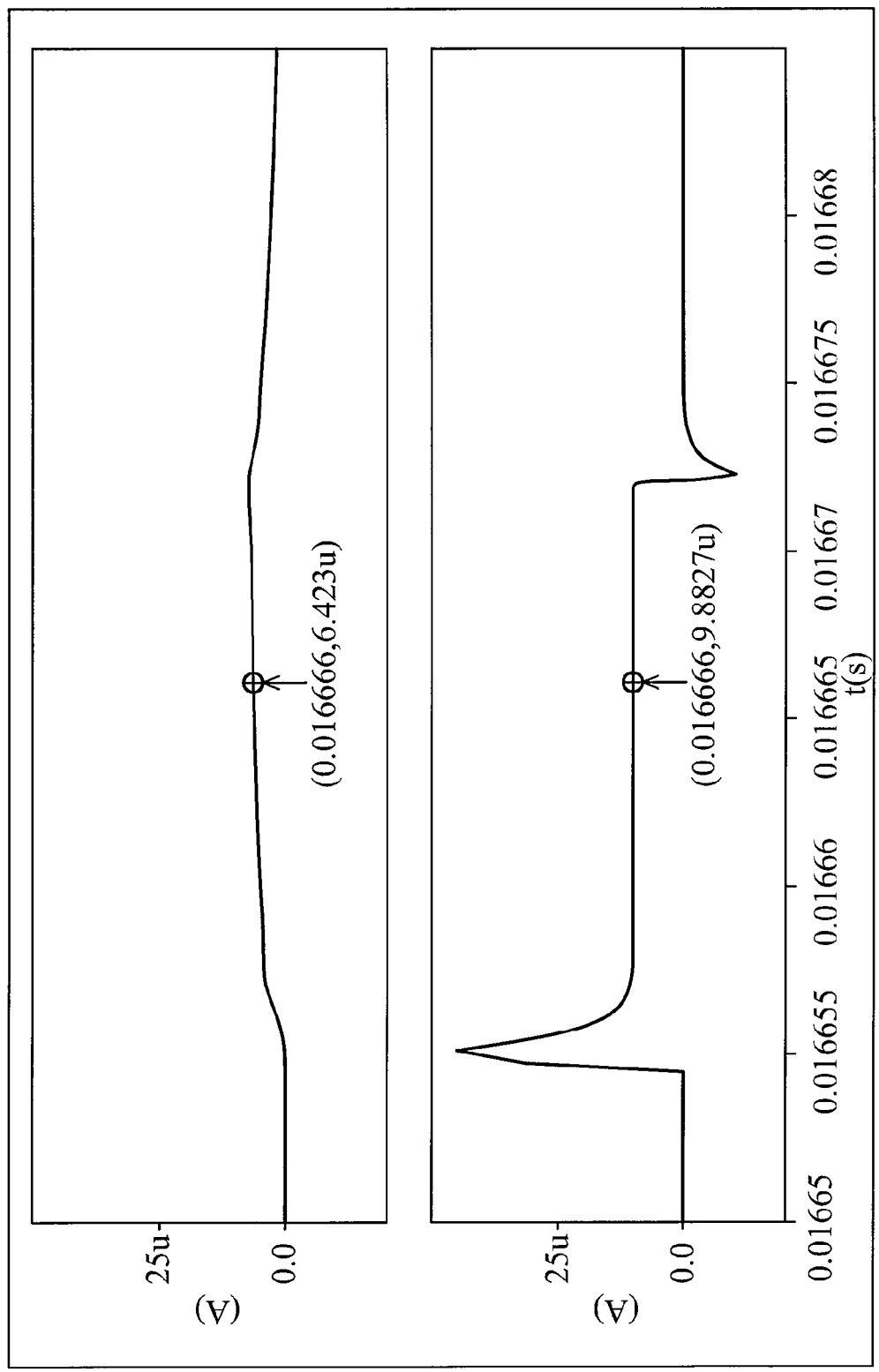
FIG. 4 shows a simulated result of the conventional liquid crystal touch panel.
Figure 7:
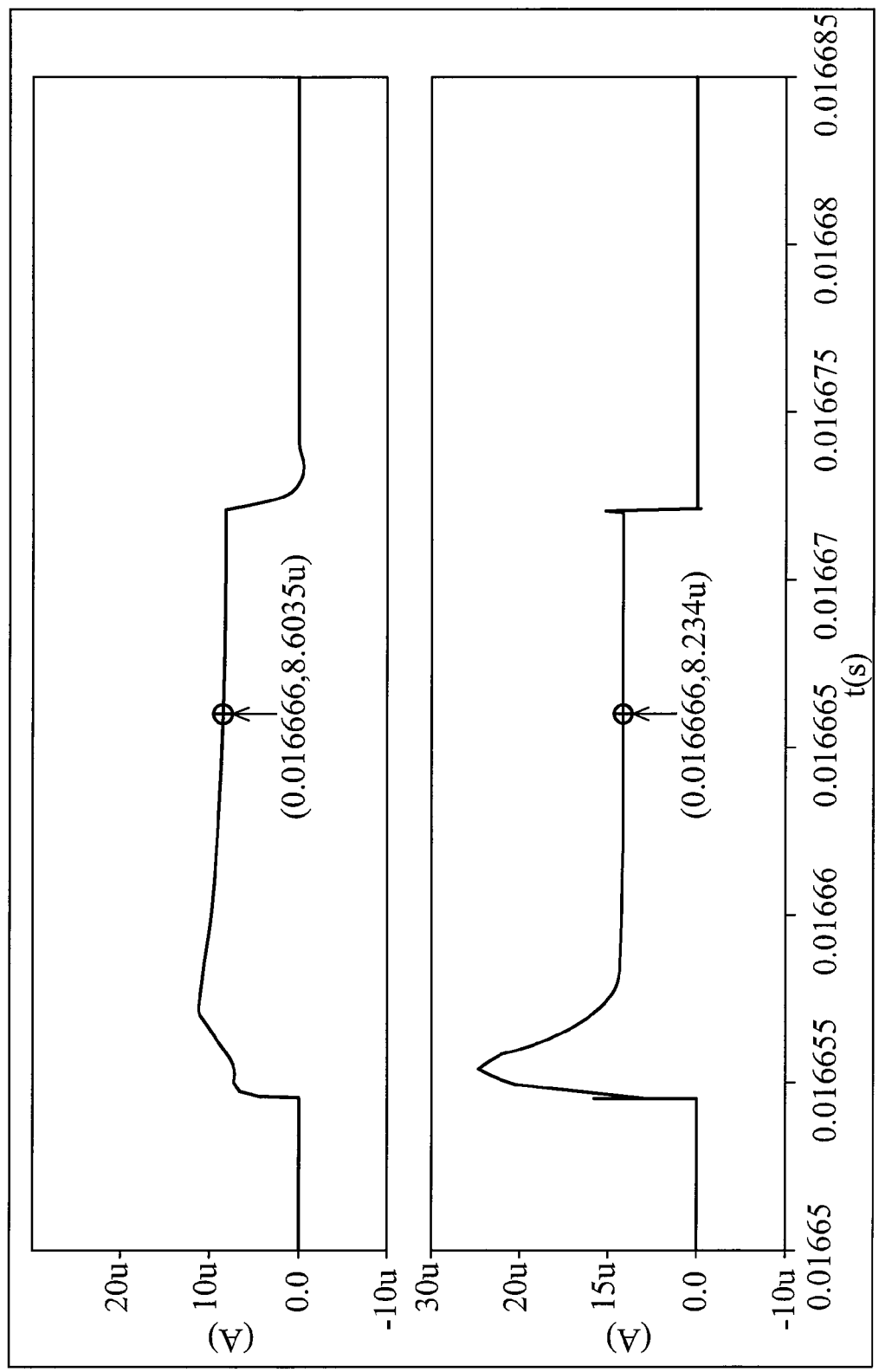
FIG. 7 shows a simulated result of the liquid crystal touch panel of the invention.

FIG. 7 shows a simulated result of the invention. FIG. 4 shows a simulated result of a conventional liquid crystal touch panel. Comparing the lower waveforms of FIG. 4 and FIG. 7, the photo-sensed signal generated by the photo-sensor of the invention is similar to that of the conventional liquid crystal display panel. With reference to the lower waveform of FIG. 7, the photo-sensed signal at the gate-in terminal of the access line 68 measures 8.234 µA. With reference to the upper waveform of FIG. 7, the photo-sensed signal at the gate-end terminal of the connection pad of the invention measures 8.6035 µA. With reference to the lower waveform of FIG. 4, the photo-sensed signal at the gate-in terminal of the access line 26 measures 9.8827 µA. With reference to the upper waveform of FIG. 4, the photo-sensed signal at the gate-end terminal of the connection pad 36 of the conventional liquid crystal touch panel measures 6.423 µA. It can be seen that the invention overcomes the drawbacks of the conventional technique. In the invention, the photo-sensed signal is unaffected by transmission distance.

While the invention has been described by way of example and in terms of preferred embodiment, it is to be understood that the invention is not limited thereto. To the contrary, it is intended to cover various modifications and similar arrangements (as would be apparent to those skilled in the art). For example, the invention can not only be employed in the panel with input function (such as touch panel, light-sensor panel and so on), but also can be utilized in TN mode, STN mode, OCB (Optically compensated bend) mode, VA (Vertical Alignment) mode, IPS (In-plane switch) mode, FFS (Fringe field switch) mode, FLC (Ferroelectric Liquid Crystal) mode and so on. Therefore, the scope of the appended claims should be accorded to the broadest interpretation so as to encompass all such modifications and similar arrangements.

What is claimed is:

1. A liquid crystal display panel, comprising:
   a plurality of scan lines, fabricated along a first axis;
   a plurality of data lines, fabricated along a second axis, perpendicular to the scan lines and transmitting data into the liquid crystal panel;
   an access line, fabricated along the second axis;
   a first pixel and a second pixel, each surrounded by two adjacent scan lines and two adjacent data lines, wherein the second pixel comprises a photo sensor coupled to the access line; and
   a fan-out line and a switch,
   wherein the fan-out line couples the access line to the switch, the switch controls a electrically connection between the fan-out line and a signal processor, and the access line is floating when the switch is turned off.

2. The liquid crystal display panel as claimed in claim 1, wherein the first pixel further comprises:
   a first thin film transistor having a gate electrically connected to one of the two adjacent scan lines, a source electrically connected to one of the two adjacent data lines, and a drain electrically connected to a first pixel electrode.

3. The liquid crystal display panel as claimed in claim 2, wherein the second pixel comprises:
   a second thin film transistor and a third thin film transistor, wherein gates of the second and third thin film transistors are electrically connected to the two adjacent scan lines surrounding the second pixel, respectively,
   wherein the second thin film transistor further has a source electrically connected to one of the two adjacent data lines surrounding the second pixel, and has a drain electrically connected to a second pixel electrode,
   wherein the third thin film transistor further has a source electrically connected to the photo-sensor, and has a drain electrically connected to the access line.

4. The liquid crystal display panel as claimed in claim 3, wherein the photo-sensor is implemented by a fourth thin film transistor having a gate and a source both electrically connected to a bias voltage line, and a drain electrically connected to the source of the third thin film transistor.

5. The liquid crystal display panel as claimed in claim 4, wherein the bias voltage line is biased in a constant voltage level.

6. The liquid crystal display panel as claimed in claim 3, wherein the switch is turned on when the third thin film transistor is turned on.

7. The liquid crystal display panel as claimed in claim 3, wherein the scan line connected to the gate of the third thin film transistor is connected to the gate of one of the first thin film transistors.

8. The liquid crystal display panel as claimed in claim 7, wherein the switch is turned on when the third thin film transistor and the first thin film transistor that is connected with the third thin film transistor are turned on.

9. The liquid crystal display panel as claimed in claim 1, wherein the switch is implemented via metal oxide semiconductor.

10. The liquid crystal display panel as claimed in claim 1, wherein an on-resistance of the switch is greater than resistance of the access line and the fan-out line.

11. A liquid crystal display panel, comprising:
    a plurality of scan lines fabricated along a first axis;
    a plurality of data lines fabricated along a second axis;
    an access line, fabricated along the second axis;
    a first pixel, surrounded by two adjacent scan lines and two adjacent data lines;
    a second pixel, surrounded by two adjacent scan lines and two adjacent data lines, and comprising a photo sensor coupled to the access line; and
    a fan-out line and a switch,
    wherein the fan-out line couples the access line to the switch, and the switch controls a electrically connection between the fan-out line and a signal processor, and the access line is floating when the switch is turned off.

12. The liquid crystal display panel as claimed in claim 11, wherein the first pixel comprises a first thin film transistor.

13. The liquid crystal display panel as claimed in claim 12, wherein the first thin film transistor comprises a gate electrically connected to one of the two adjacent scan lines surrounding the first pixel, and a source electrically connected to one of the two adjacent data lines surrounding the first pixel.

14. The liquid crystal display panel as claimed in claim 13, wherein the first thin film transistor further comprises a drain electrically connected to a first pixel electrode.

15. The liquid crystal display panel as claimed in claim 11, wherein the second pixel comprises a second thin film transistor and a third thin film transistor.

16. The liquid crystal display panel as claimed in claim 15, wherein the gates of the second and third thin film transistor are electrically connected to the two adjacent scan lines surrounding the second pixel, respectively.

17. The liquid crystal display panel as claimed in claim 16, wherein the second thin film transistor further comprises a source electrically connected to one of the two adjacent data lines surrounding the second pixel, and a drain electrically connected to a second pixel electrode.

18. The liquid crystal display panel as claimed in claim 17, wherein the third thin film transistor further comprises a source electrically connected to the photo-sensor, and a drain electrically connected to the access line.

19. The liquid crystal display panel as claimed in claim 18, wherein the switch is turned on when the third thin film transistor is turned on.

20. The liquid crystal display panel as claimed in claim 11, wherein an on-resistance of the switch is greater than resistance of the access line and the fan-out line.

* * * * *